(12) United States Patent
Tawara

(10) Patent No.: US 11,534,031 B2
(45) Date of Patent: Dec. 27, 2022

(54) SANDWICH CRIMPER

(71) Applicant: Kei Tawara, Lancaster, PA (US)

(72) Inventor: Kei Tawara, Lancaster, PA (US)

( * ) Notice: Subject to any disclaimer, the term of this patent is extended or adjusted under 35 U.S.C. 154(b) by 305 days.

(21) Appl. No.: 17/037,446

(22) Filed: Sep. 29, 2020

(65) Prior Publication Data
US 2021/0137317 A1   May 13, 2021

Related U.S. Application Data

(63) Continuation-in-part of application No. 29/738,591, filed on Jun. 18, 2020, now Pat. No. Des. 962,727, and a continuation-in-part of application No. 16/746,689, filed on Jan. 17, 2020, now Pat. No. 11,490,647.

(60) Provisional application No. 62/934,101, filed on Nov. 12, 2019.

(51) Int. Cl.
*A47J 43/20*         (2006.01)
*A21C 15/04*       (2006.01)
*A23P 20/20*       (2016.01)

(52) U.S. Cl.
CPC .............. *A47J 43/20* (2013.01); *A21C 15/04* (2013.01); *A23P 20/20* (2016.08)

(58) Field of Classification Search
CPC ...... A23P 20/20; A47J 33/00; B26D 2210/02; A21C 15/02; A21C 15/04
See application file for complete search history.

(56) References Cited

U.S. PATENT DOCUMENTS

| | | | | |
|---|---|---|---|---|
| 4,759,706 A | * | 7/1988 | Damianakos | A47J 43/20 249/170 |
| 6,754,965 B1 | * | 6/2004 | Kretchman | B65D 25/20 30/316 |
| 11,412,742 B2 | * | 8/2022 | Franklin | A21C 9/068 |
| 2015/0291309 A1 | * | 10/2015 | McGregor | B65D 21/086 220/573.1 |
| 2021/0137317 A1 | * | 5/2021 | Tawara | A23P 30/10 |

* cited by examiner

*Primary Examiner* — Omar Flores Sanchez

(57) ABSTRACT

An objective of the apparatus is to enable users to cut, seal, and crimp a sandwich. The apparatus is a sandwich maker that can apply pressure from both sides of the sandwich while sealing and crimping the sandwich, so as to make a perfectly rounded and spill proof sandwich. Additionally, the apparatus includes alignment pointers that enable users to create a crimped sandwich with perfectly crimped edges. Further, the apparatus includes multiple pieces and shapes that serve specific purposes and gives users the option to use them mutually exclusively. Furthermore, each of the different pieces of the apparatus have aesthetically appealing shapes and air gaps in the center, which enables users to release the sandwich easily.

19 Claims, 16 Drawing Sheets

SANDWICH CRIMPER

The current application is a continuation-in-part (CIP) application of a U.S. non-provisional application Ser. No. 16/746,689 filed on Jan. 17, 2020. The U.S. non-provisional application Ser. No. 16/746,689 claims a priority to a U.S. provisional application Ser. No. 62/934,101 filed on Nov. 12, 2019.

The current application is also a CIP application of a U.S. design patent application Ser. No. 29/738,591 filed on Jun. 18, 2020.

FIELD OF THE INVENTION

The present invention relates generally to a sandwich crimper. More specifically, the present invention is an apparatus for making sealed crimped sandwiches.

BACKGROUND OF THE INVENTION

Many people, especially kids prefer and enjoy a crustless, sealed, and crimped sandwich over a regular sandwich. A sealed crustless sandwich is a foodstuff comprising a filling sealed between two layers of bread by a crimped edge, with the crust subsequently removed. Most sandwich makers available in the market often do not form a good seal, and/or form cracks on the surface of the bread upon sealing. This leads to spill out of the filling through the sandwich or an aesthetically imperfect looking sandwich. Crimping at the edges provide a better seal and an aesthetically appealing shape to the sandwiches. Also, a sandwich maker which can cut, seal and crimp the sandwich in multiple shapes is a rare find in the current market.

An objective of the present invention is to provide users with an apparatus, that can cut, seal, and crimp a sandwich in multiple shapes. It is an aim of the present invention to provide a sandwich maker that can apply pressure from both sides of the sandwich while sealing and crimping the sandwich so as to make a perfectly rounded and spill proof sandwich. In order to accomplish that, two pieces of the present invention, that seal and crimp the sandwich comprise curved inner surfaces that help the sandwich to give a rounded or dome shape on opposing surfaces of the sandwich. Additionally, the present invention comprises alignment pointers that enable users to create a crimped sandwich with perfectly crimped edges. Further, the present invention comprises multiple pieces and shapes that serve specific purposes. More specifically, the present invention gives users the option to just cut the crusts off of the bread, or cut materials for the filling (such as cheese, meat, vegetables etc.), or just seal and crimp the sandwich, mutually exclusively with the different pieces of the present invention. Furthermore, each of the different pieces of the present invention have openings or air gaps in the center, which enable users to release the sandwich easily. Thus, the present invention enables users to have a perfectly sealed, crimped, spill proof, and aesthetically appealing sandwich with a slightly rounded shape on opposing sides.

DETAIL DESCRIPTIONS OF THE INVENTION

All illustrations of the drawings are for the purpose of describing selected versions of the present invention and are not intended to limit the scope of the present invention.

In reference to FIG. 1 through FIG. 16, the present invention is a sandwich crimper. An objective of the present invention is to provide users with an apparatus, that can cut, seal, and crimp a sandwich in multiple shapes. It is an aim of the present invention to provide a sandwich maker that can apply pressure from both sides of the sandwich while sealing and crimping the sandwich so as to make a perfectly rounded and spill proof sandwich. In order to accomplish that, two pieces that seal and crimp the sandwich comprise curved inner surfaces that help the sandwich to give a rounded or dome shape on opposing surfaces of the sandwich. Additionally, the present invention comprises alignment pointers that enable users to create a crimped sandwich with perfectly crimped edges. Further, the present invention comprises multiple pieces and shapes that serve specific purposes. More specifically, the present invention gives users the option to just cut the crusts off of the bread, or cut materials for the filling (such as cheese, meat, vegetables etc.), or just seal and crimp the sandwich, mutually exclusively with the different pieces of the present invention. Furthermore, each of the different pieces of the present invention have openings in the center, which enables users to push through the openings and release the sandwich easily. Thus, the present invention enables users to have a perfectly sealed, crimped, spill proof, and aesthetically appealing sandwich with a slightly rounded shape on opposing sides.

Figure 1:
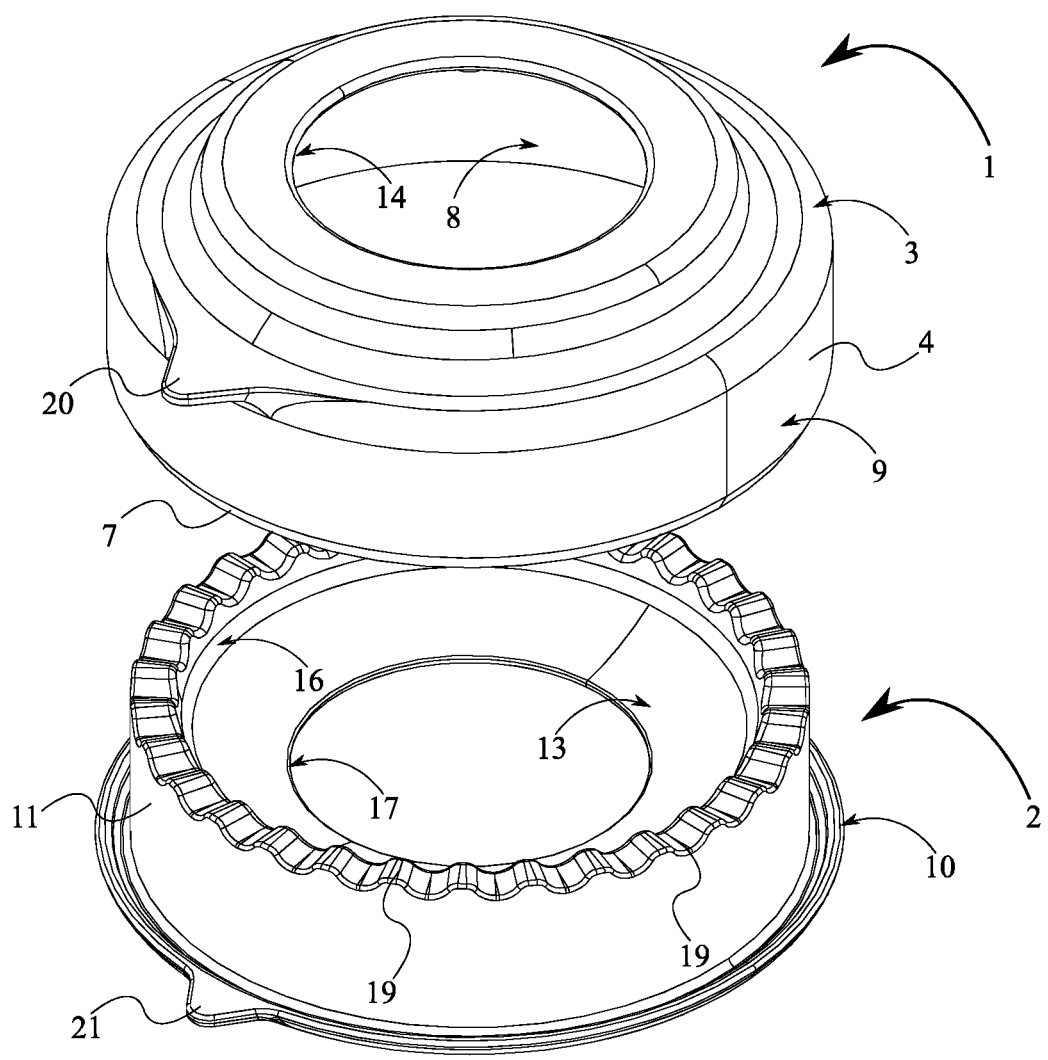
FIG. 1 is a top-front left perspective view of the present invention in an exploded configuration.
Figure 2:
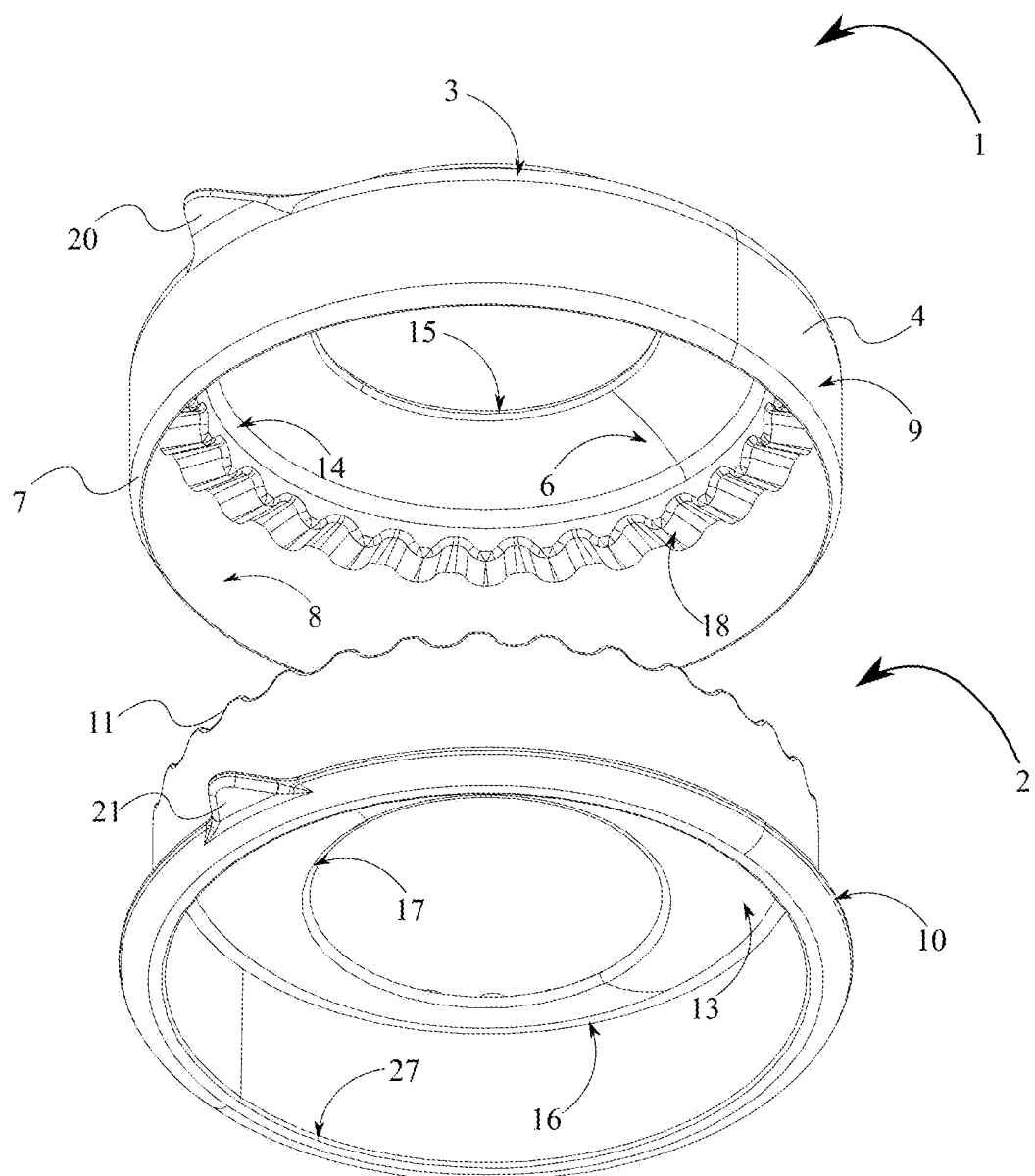
FIG. 2 is a bottom-front-left perspective view of the present invention in an exploded configuration.

The following description is in reference to FIG. 1 through FIG. 10. As seen in FIG. 1, the present invention comprises a primary cutting die 1 and a crimping press 2. The primary cutting die 1 and the crimping press 2 can comprise any shape, size, material, features, type or kind, quantity, components, and arrangements of components that would allow the present invention to fulfill the objectives and intents of the present invention. However, in the preferred embodiment of the present invention, the primary cutting die 1 is circular in shape and comprises a first rim 3, a first lateral sidewall 4, a first crimping edge 5, a first oblique surface 6, and at least one primary blade 7. According to the preferred embodiment, the first lateral sidewall 4 is connected in between the first rim 3 and the at least one primary blade 7. This is so that the user may conveniently hold the first rim 3 along with the first lateral sidewall 4 within the user's hand and press the at least one primary blade 7 over a piece of bread, to have the piece of bread cut in the shape of the primary blade 7. Further, the first lateral sidewall 4 is positioned coextensive to the at least one primary blade 7 and the first rim 3, such that the lower portion of the lateral sidewall 4 along with the primary blade 7 forms a smooth cut on the bread, without any imperfections along the perimeter of the cut piece of bread. According to the present invention, the primary cutting die 1 is intended to cut the sides or crusts off of a piece of bread. However, the primary cutting die 1 may be used for cutting any material, such as cookie dough, pastry, playdough etc. that may be cut with the sharpness of the primary blade 7. Furthermore, the first lateral sidewall 4 comprises an inner surface 8 and an outer surface 9, wherein the inner surface 8 is positioned opposite to the outer surface 9 across the first lateral sidewall.

According to the preferred embodiment of the present invention, the primary cutting die 1 and the crimping press 2 together are intended to seal and crimp the edges of two pieces of bread with a filling inside, to make a sandwich. Accordingly, the first crimping edge 5 is positioned perimetrically along the inner surface 8, and the first crimping edge 5 is laterally offset from the at least one primary blade 7. In other words, the first crimping edge 5 is positioned along the inner surface 8, and opposite to the first rim 3, thereby enabling the primary cutting die 1 to perform both functions of cutting and crimping the edge of a sandwich. Continuing with the preferred embodiment of the present invention, the crimping press 2 comprises a second rim 10, a second lateral sidewall 11, second crimping edge 12, and a second oblique surface 13. Preferably, the second rim 10 constitutes a bottom surface of the crimping press 2 and the second crimping edge 12 constitutes an upper surface of the crimping press 2. Further, the second rim 10 is wider and thicker than the first rim 3. This is so that, the crimping press 2 may be placed on a counter or table surface with the second rim 10 touching the table surface and forming a stable platform for creating the sandwich. Accordingly, the second crimping edge 12 will be facing the user, ready to receive the piece of bread that needs crimping. Furthermore, the second lateral sidewall 11 is connected in between the second rim 10 and the second crimping edge 12, such that the second lateral sidewall 11 provides the space for accommodating the thickness of the sandwich, during the process of sealing and crimping the sandwich. Additionally, the second lateral sidewall 11 is positioned coextensive to the second crimping edge 12. As a result, the second lateral sidewall 11 forms a seamless connection with the second crimping edge 12, and the user may create a crack free and uniformly crimped sandwich, without any imperfections.

According to the preferred embodiment, the sandwich crimper is intended to create a spill proof and crack proof sandwich that has a rounded shape on both opposing surfaces of the sandwich. In order to accomplish that, the primary cutting die 1 and the crimping press 2 have oblique inner surfaces. Accordingly, a first edge 14 of the first oblique surface 6 is perimetrically connected to the first rim 3, and a second edge 15 of the first oblique surface 6 is positioned offset from the first rim 3 and opposite to the at least one primary blade 7. In other words, the first oblique surface 6 extends above and away from the first rim 3. Further, the first oblique surface 6 tapers from the first edge 14 to the second edge 15, thereby enabling users to create a dome shaped surface to an upper surface of the sandwich. Similarly, with regard to the crimping press 2, a third edge 16 of the second oblique surface 13 is perimetrically connected to the second crimping edge 12, a fourth edge 17 of the second oblique surface 13 is positioned in between the second crimping edge 12 and the second rim 10, and the second oblique surface 13 tapers from the third edge 16 to the fourth edge 17. In other words, the second oblique surface 13 extends inward from the second crimping edge 12 towards a center of the crimping press 2. This arrangement of the second oblique surface 13 on the sealing press 2, enables the user to create a dome shape or a rounded lower surface for the sandwich. Thus, the first oblique surface 6 and the second oblique surface 13 enable users to compress the sandwich without creating any cracks or spillage of the filling, as well as give a slightly bulged shape for the upper and lower surfaces of the sandwich.

Figure 3:
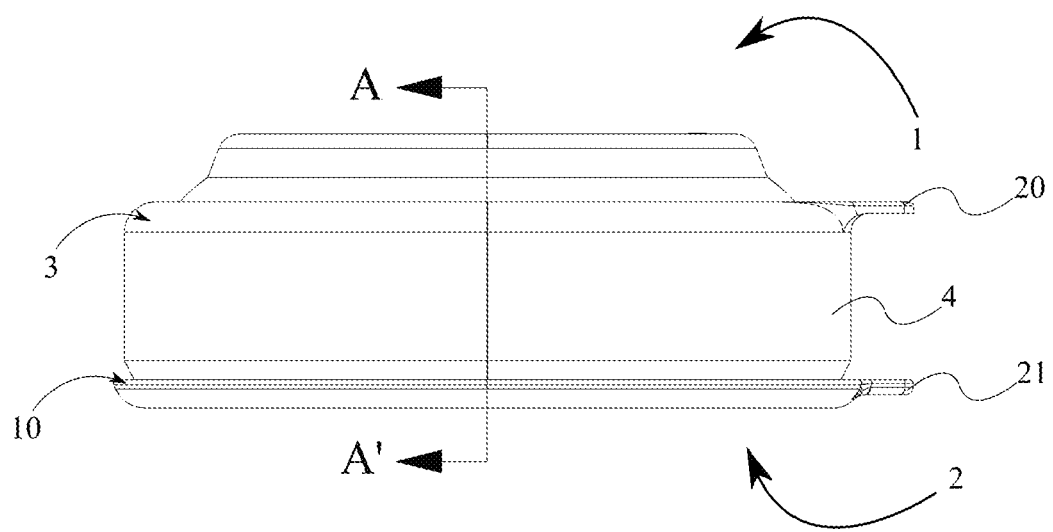
FIG. 3 is a right-side perspective view of the present invention in a nested configuration.
Figure 4:
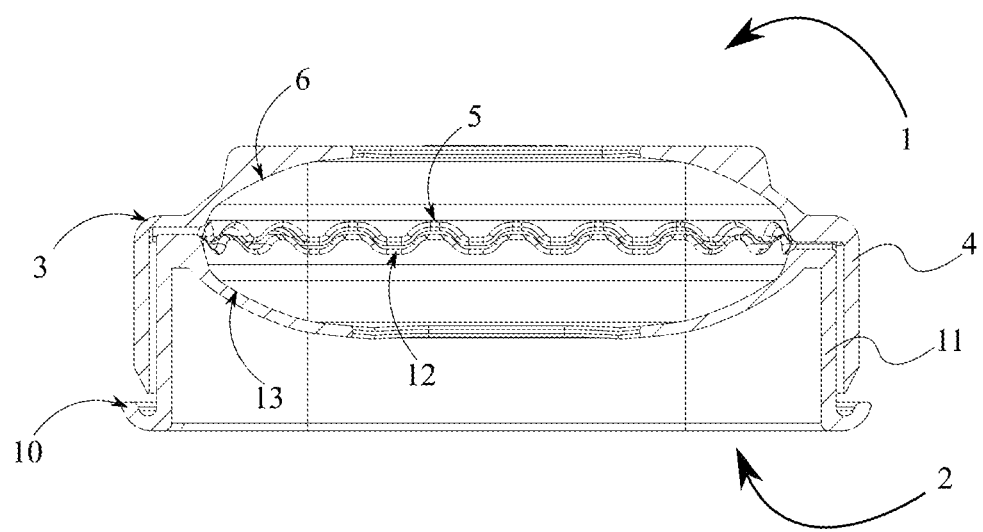
FIG. 4 is a sectional view of the present invention taken along A-A' of FIG. 3.

In order to accomplish the intended functionality of sealing and crimping a sandwich, the primary cutting die 1 and the crimping press 2 are brought together with force. Additionally, the primary cutting die 1 and the crimping press 2 may be stacked one over the other in a compact fashion for storage purposes as well. As seen in FIG. 3 and FIG. 4, the dimensions of the primary cutting die 1 and the crimping press 2 are such that, the crimping press 2 may be nested within the primary cutting die 1. In other words, the primary cutting die 1 comprises transversal dimensions in such a way that the first lateral sidewall 4 overlaps the second lateral sidewall 11, until the first crimping edge 5 meets the second crimping edge 12. Thus, when the crimping press 2 is nested within the primary cutting die 1, the first crimping edge 5 is pressed against the second crimping edge 12. This arrangement is crucial for creating spill proof and aesthetically appealing crimped sandwiches. Further, this enables the user to stack and store the present invention in a compact fashion, when not in use.

According to the preferred embodiment of the present invention, the first crimping edge 5 comprises a first plurality of folds and ridges 18, and the second crimping edge 12 comprises a second plurality of folds and ridges 19. As seen in FIG. 1, FIG. 2, FIG. 4 and FIG. 5, the first plurality of folds and ridges 18 is distributed along the first crimping edge 5, and the second plurality of folds and ridges 19 is distributed along the second crimping edge 12. Preferably, the first plurality of folds and ridges 18 and the second plurality of folds and ridges 19 help create a better seal and create crimping on the edges of the two pieces of bread. The crimp/design on the edges of the bread will depend on the size and shape of the plurality of folds and ridges. Preferably, the first plurality of folds and ridges 18 and the second plurality of folds and ridges 19 comprise a smooth wavy pattern and span a couple of centimeters in length. However, the first plurality of folds and ridges 18 and the second plurality of folds and ridges 19 may comprise any other shape, size or design, as long as the intended purpose of the present invention is not hindered.

It is an objective of the present invention to have perfectly crimped edges for a sandwich. In order to accomplish that, the present invention comprises a first pointer 20 extending from the first rim 3 and a second pointer 21 extending from the second rim 10. Preferably, a first transversal cross section of the first pointer 20 corresponds to a second transversal cross section of the second pointer 21. This is so that when the first pointer 20 is aligned with the second pointer 21, the first plurality of folds and ridges 18 aligns with the second plurality of folds and ridges 19, thereby enabling the user to create perfectly crimped edges. As seen in FIG. 1 through FIG. 10, the first pointer 20 and the second pointer 20 comprise a rounded triangular shape and they extend out from the first rim 3 and the second rim 10 respectively in a direction normal to the first lateral sidewall 4 and the second lateral sidewall 11 respectively. However, the first pointer 20 and the second pointer 21 may comprise any other shape, size, orientation, components and arrangement of components, as long as the objectives of the present invention are fulfilled.

According to the preferred embodiment of the present invention, the second edge 15 of the first oblique surface 6 delineate the shape of the primary cutting die 1. As seen in FIG. 1 through FIG. 16, the second edge 15 constitutes the edge of an opening that extends around the center of the primary cutting die 1. This opening leaves room for an air gap, which helps users to release the sandwich with ease. Further, the fourth edge 17 of the second oblique surface 13 delineate the shape of the crimping press 2. The fourth edge 17 constitutes the edge of an opening that extends around the center of the crimping press 2. Thus, the shape of the second edge 15 and the fourth edge 17 provide an aesthetic appeal to the structure of the present invention. For example, if the primary cutting die 1 and the crimping press 2 comprise a heart shape, the second edge 15 and the fourth edge 17 comprise a heart shape.

Continuing with the preferred embodiment, the present invention comprises a secondary cutting die 22. In the preferred embodiment of the present invention, the secondary cutting die 22 is an optional component that enables the user to cut materials for the filling, such as cheese, meat, vegetables etc. in such a way that the fillings fit perfectly within the dimensions of the sandwich. As seen in FIG. 5 through FIG. 16, the secondary cutting die 22 comprises a third rim 23, a third lateral sidewall 24, and at least one secondary blade 25, wherein the third lateral sidewall 24 is connected in between the third rim 23 and the at least one secondary blade 25. Preferably, the third rim 23 is thicker and wider than the secondary blade 25, such that the third rim 23 provides a good grip or hold for the user, and the user may conveniently hold the third rim 23 within the user's hand and press the secondary blade 25 over a piece of filling material, to have the filling material cut in the shape of the secondary blade 25. Further, a transversal cross-section of the secondary cutting die 22 corresponds to a transversal cross-section of the crimping press 2. This enables to have the cut filling material fit within the dimensions of the crimped sandwich and prevent overfilling/spilling of the filling.

Figure 5:
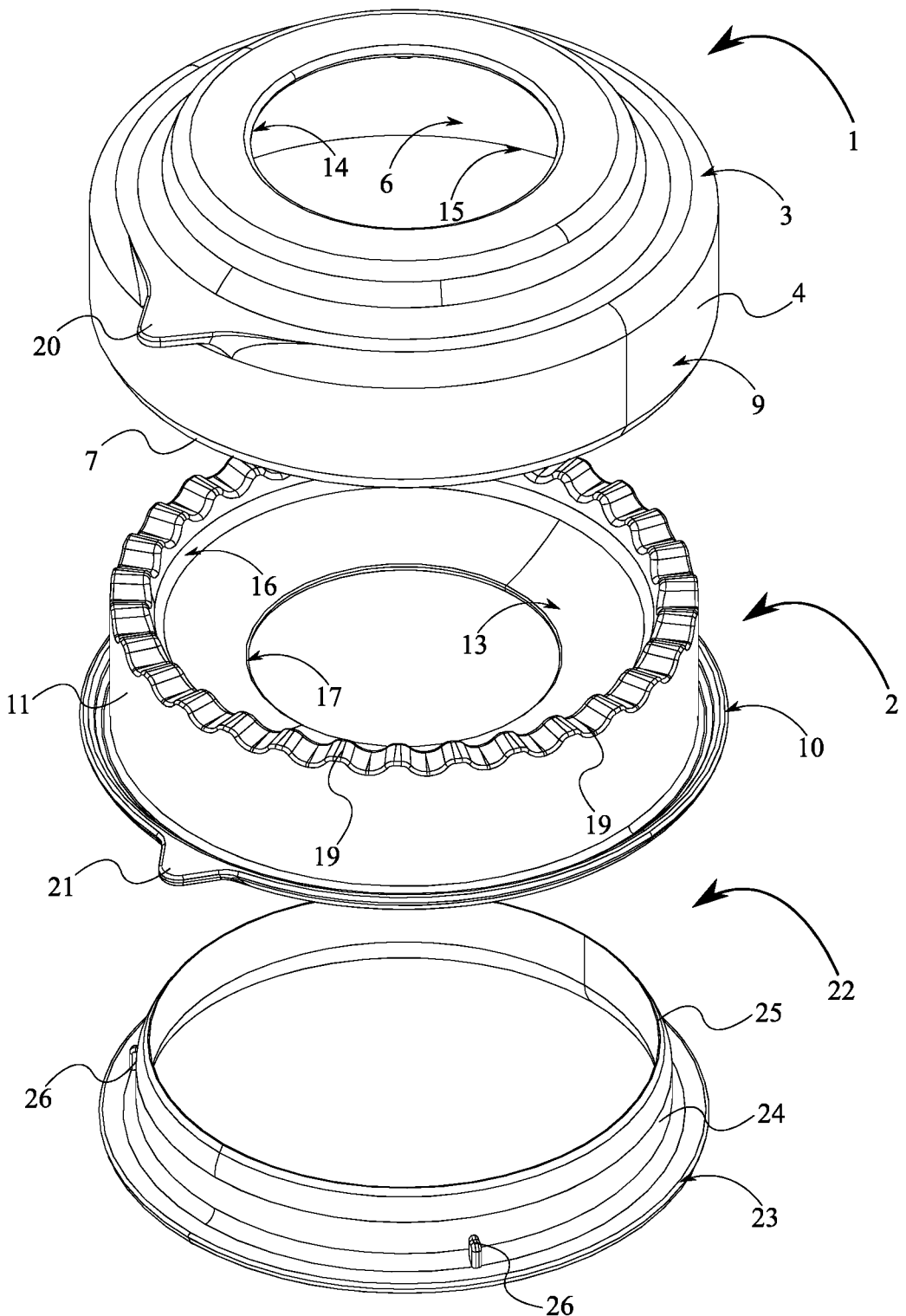
FIG. 5 is an exploded top-front-left perspective view of the present invention including a secondary cutting die.
Figure 6:
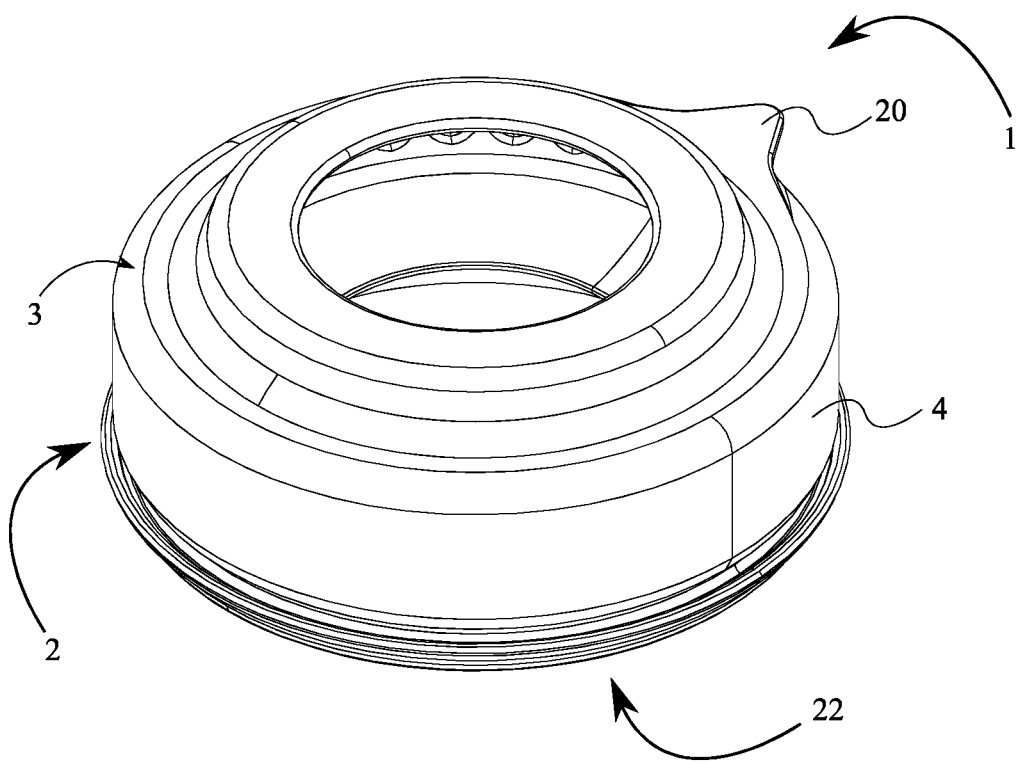
FIG. 6 is a top-rear-right perspective view of the present invention in a nested configuration.
Figure 7:
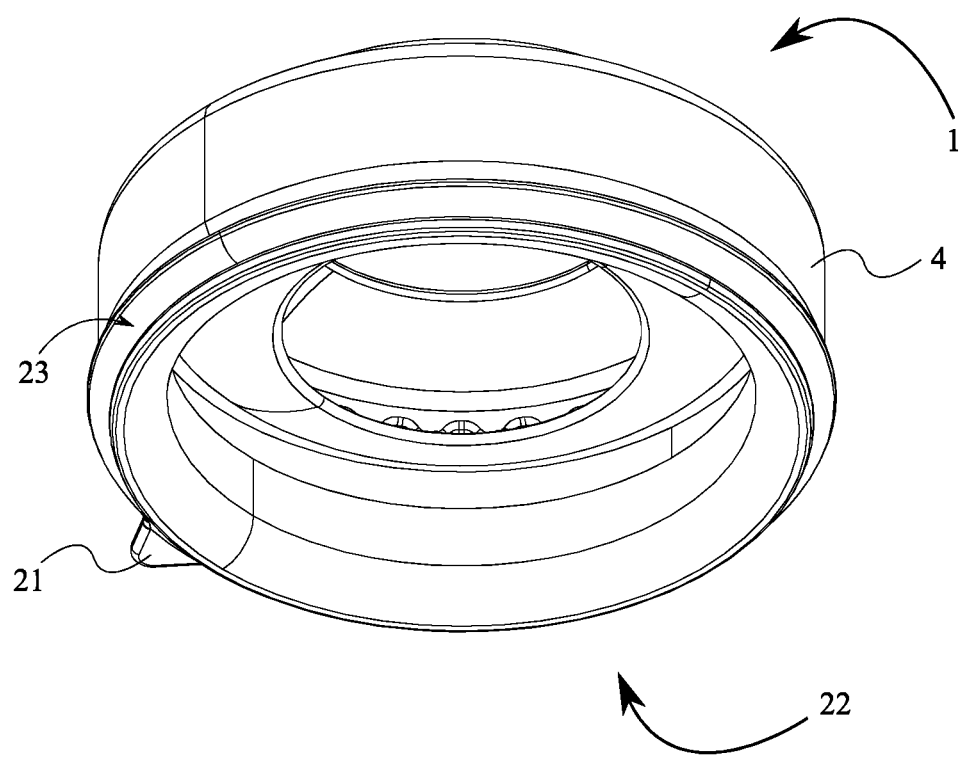
FIG. 7 is a bottom-rear-left perspective view of the present invention in a nested configuration.
Figure 8:
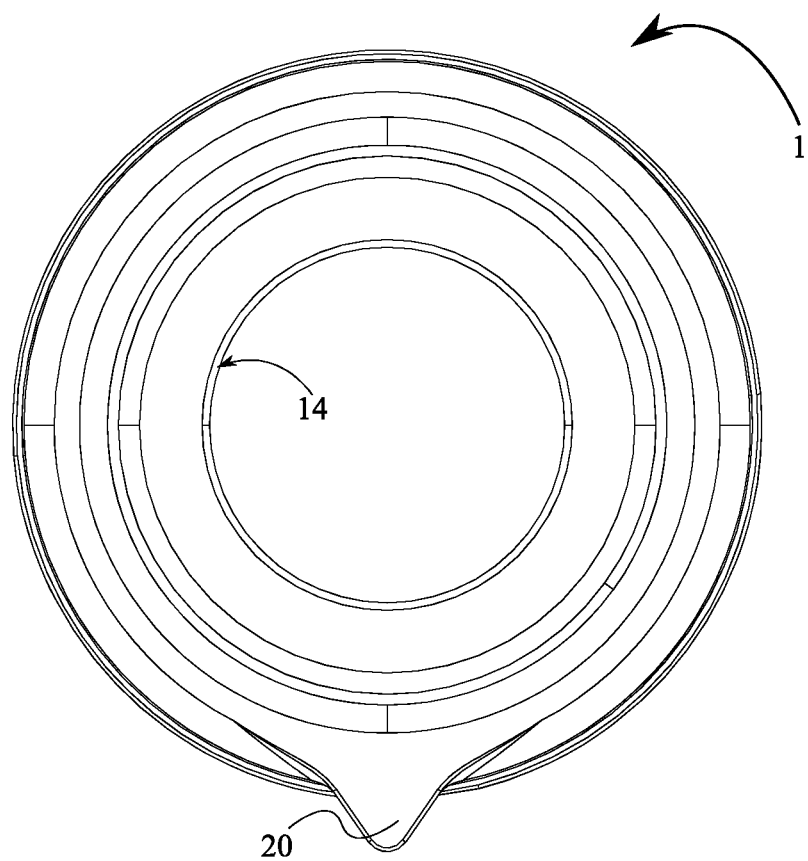
FIG. 8 is a top plan view of the present invention.
Figure 9:
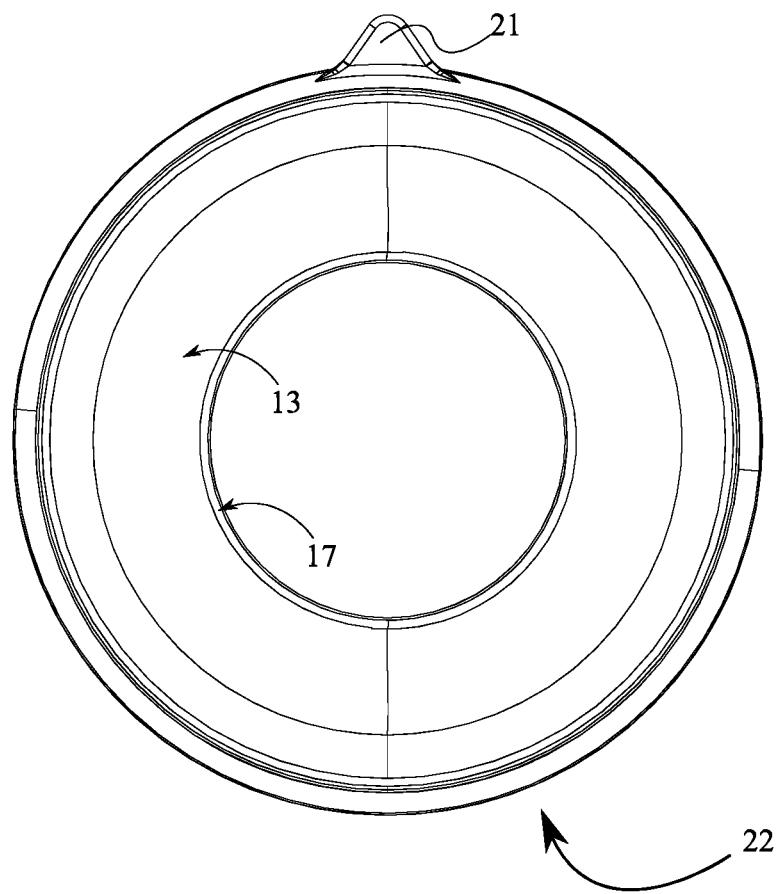
FIG. 9 is a bottom plan view of the present invention.
Figure 10:
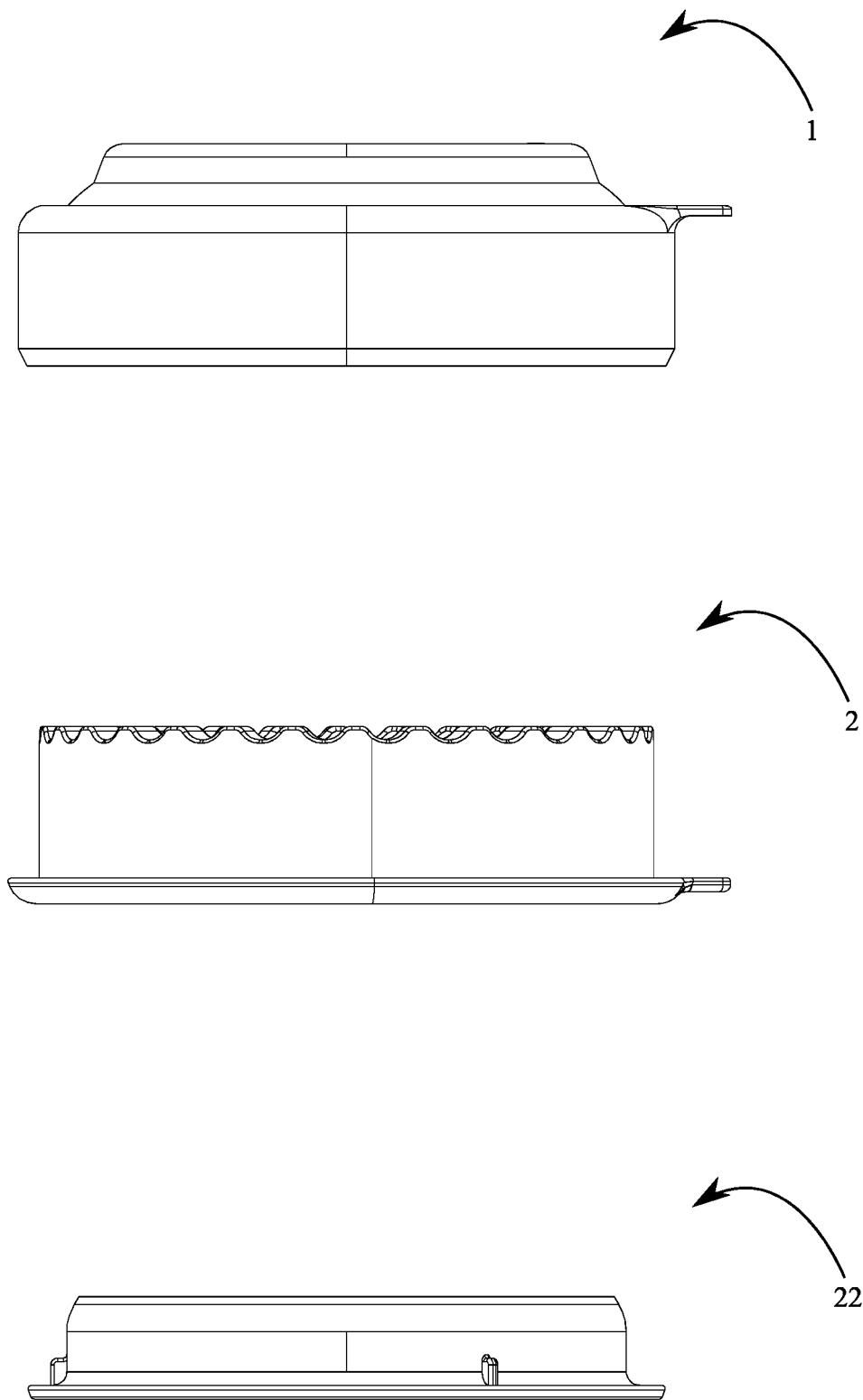
FIG. 10 is a right-side elevational view of the present invention in an exploded configuration.

In the preferred embodiment, the secondary cutting die comprises a plurality of fastening features 26. As seen in FIGS. 5 and 10, the plurality of fastening features 26 is mounted between the third rim 23 and the third lateral sidewall 24, and each of the plurality of fastening features 26 is positioned offset from each other, along the third rim 23. According to the present invention, the secondary cutting die 25 has dimensions such that, the secondary cutting die 22 may be nested within the crimping press 2. As seen in FIG. 6 and FIG. 7, the primary cutting die 1, the crimping press 2, and the secondary cutting die 22 may be stacked in an overlapping and compact fashion, when not in use. In order to nest and or stack the secondary die 23 within the crimping press in a secure fashion, the present invention comprises at least one groove 27, wherein the at least one groove 27 extends between the second rim 10 and the second lateral sidewall 11. Further, when in the nested configuration, each of the plurality of fastening features 26 engages within the at least one groove 27, thereby forming a secure fastening between the crimping press 2 and the secondary cutting die 22. In other words, each of the plurality of fastening features 26 snaps within the groove 27 to form a lock. However, the secondary cutting die 22 and the crimping press 2 may comprise any other fastening features that are known to one of ordinary skill in the art, as long as the objectives of the present invention are not altered.

Figure 11:
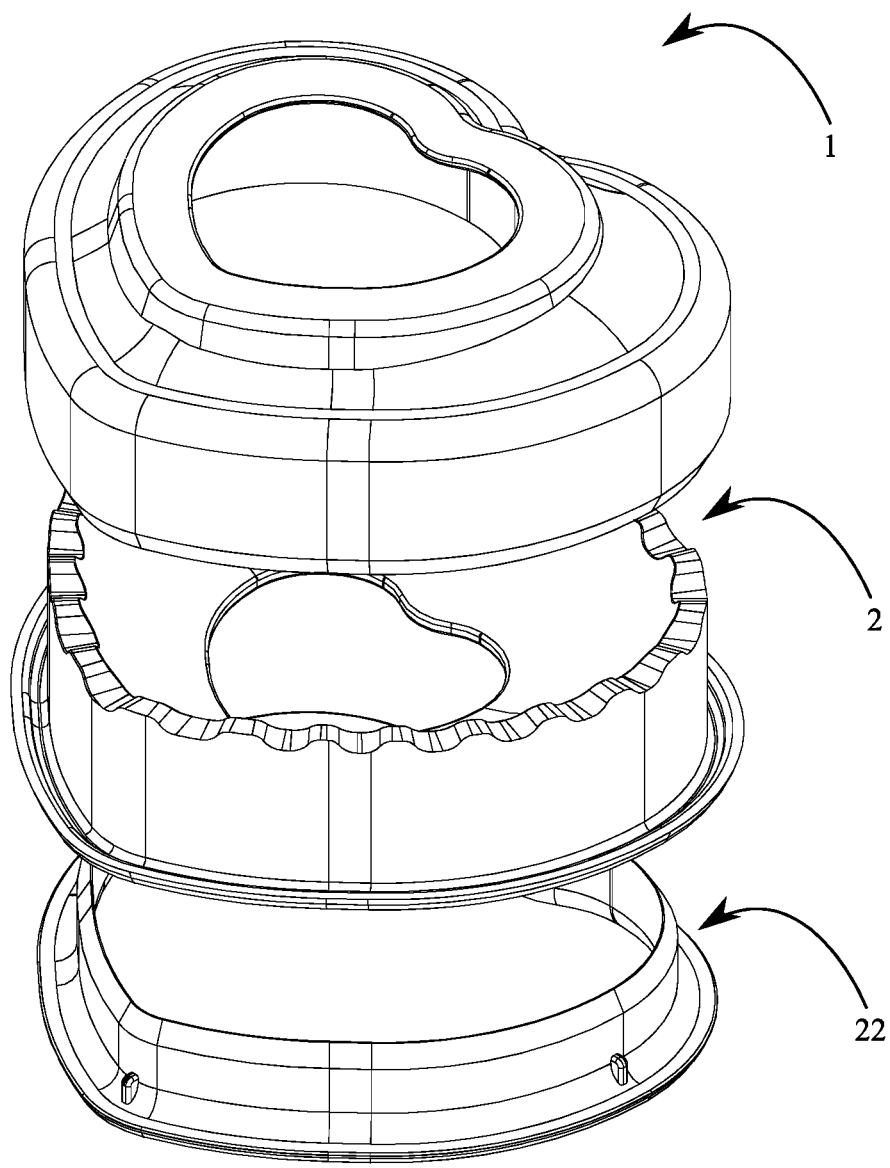
FIG. 11 is an exploded top-front-left perspective view of the present invention in heart shape.
Figure 12:
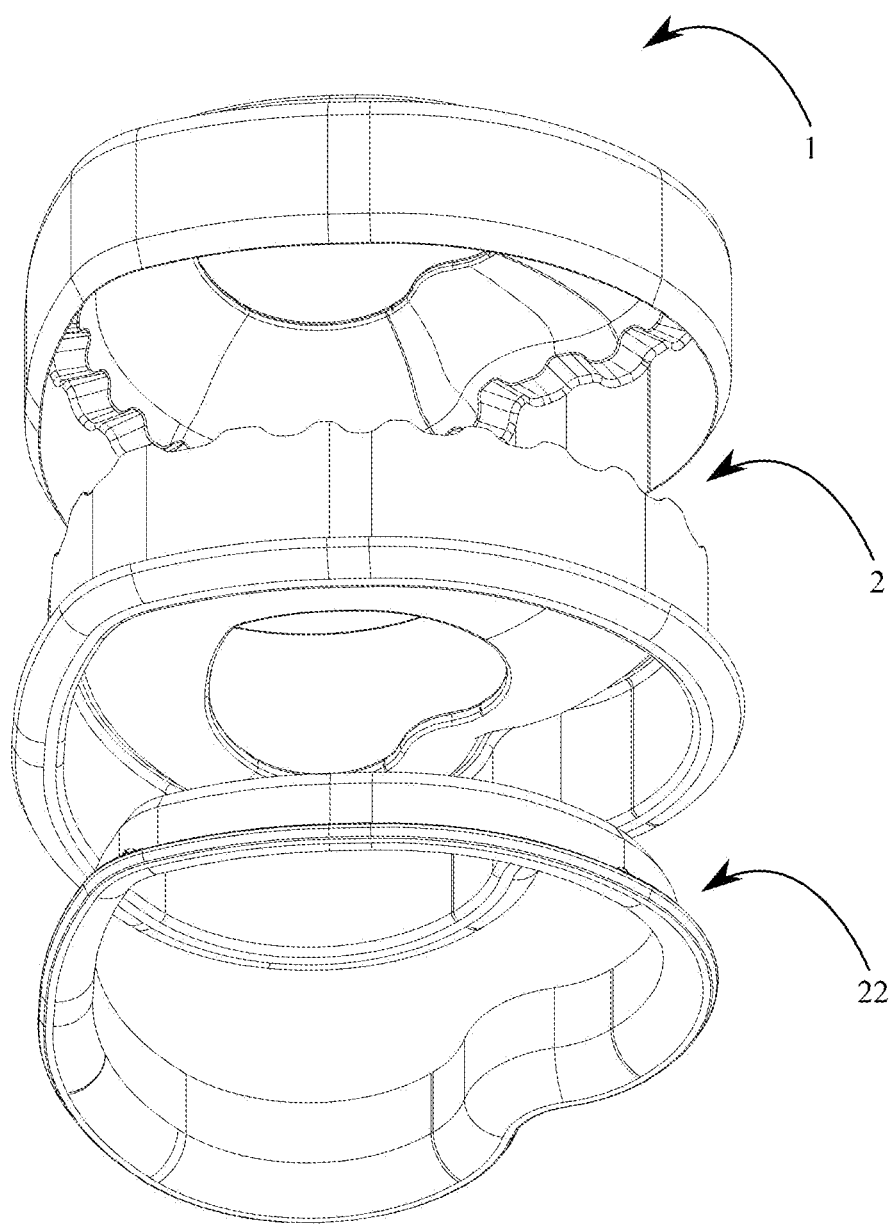
FIG. 12 is an exploded bottom-rear right perspective view of the present invention in heart shape.
Figure 13:
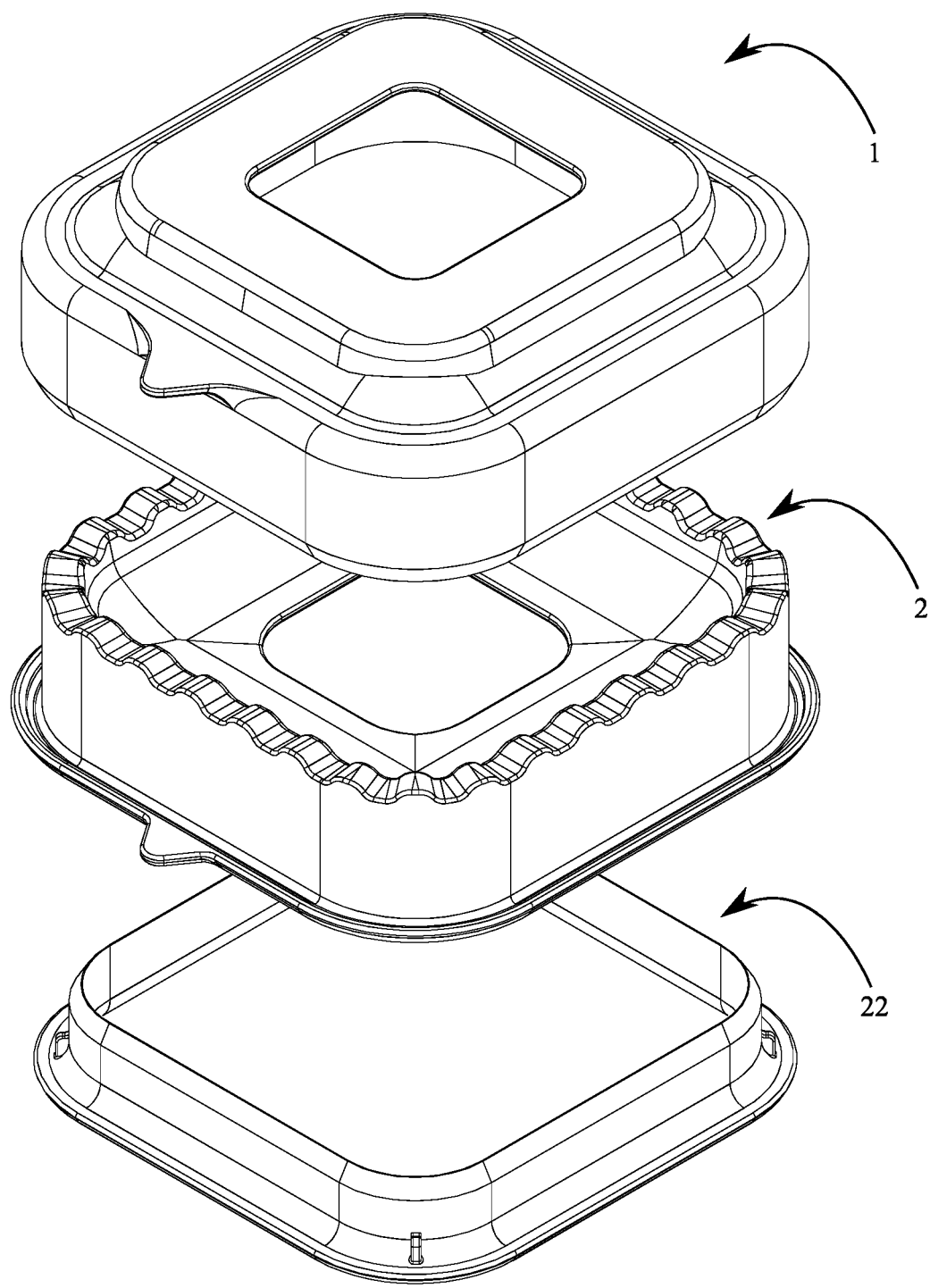
FIG. 13 is an exploded top-front-left perspective view of the present invention in square shape.
Figure 14:
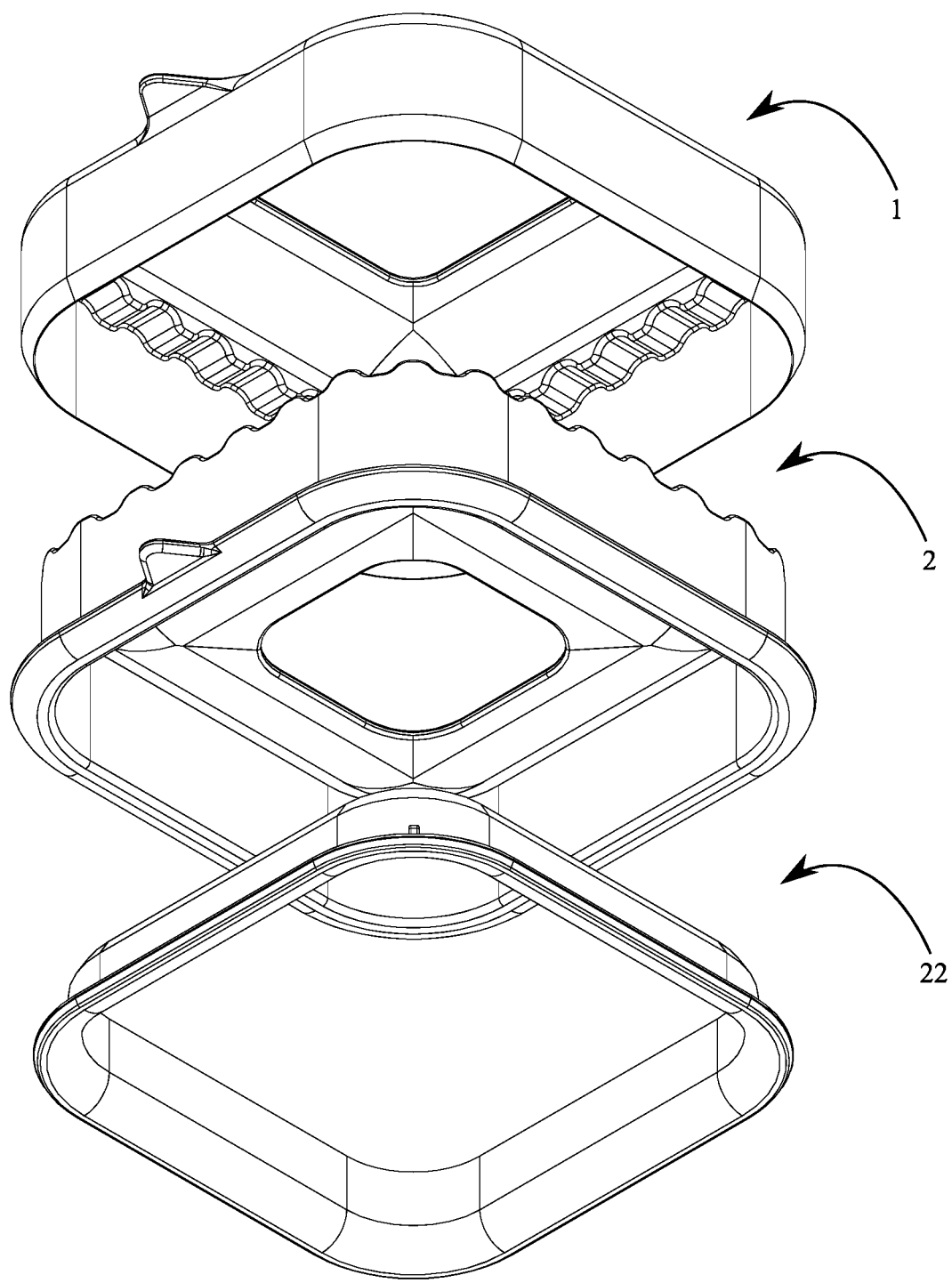
FIG. 14 is an exploded bottom-rear right perspective view of the present invention in square shape.
Figure 15:
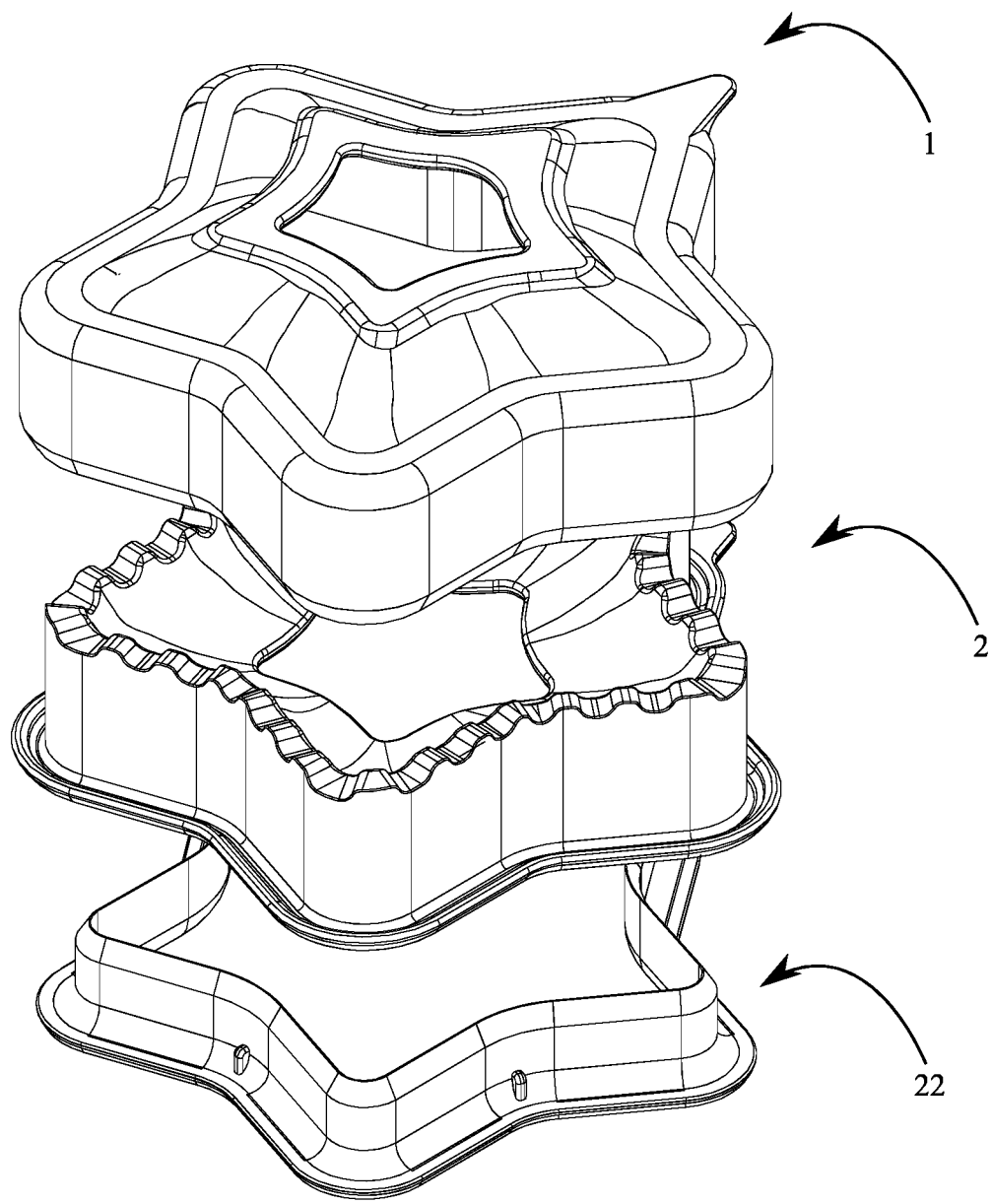
FIG. 15 is an exploded top-front-left perspective view of the present invention in star shape.
Figure 16:
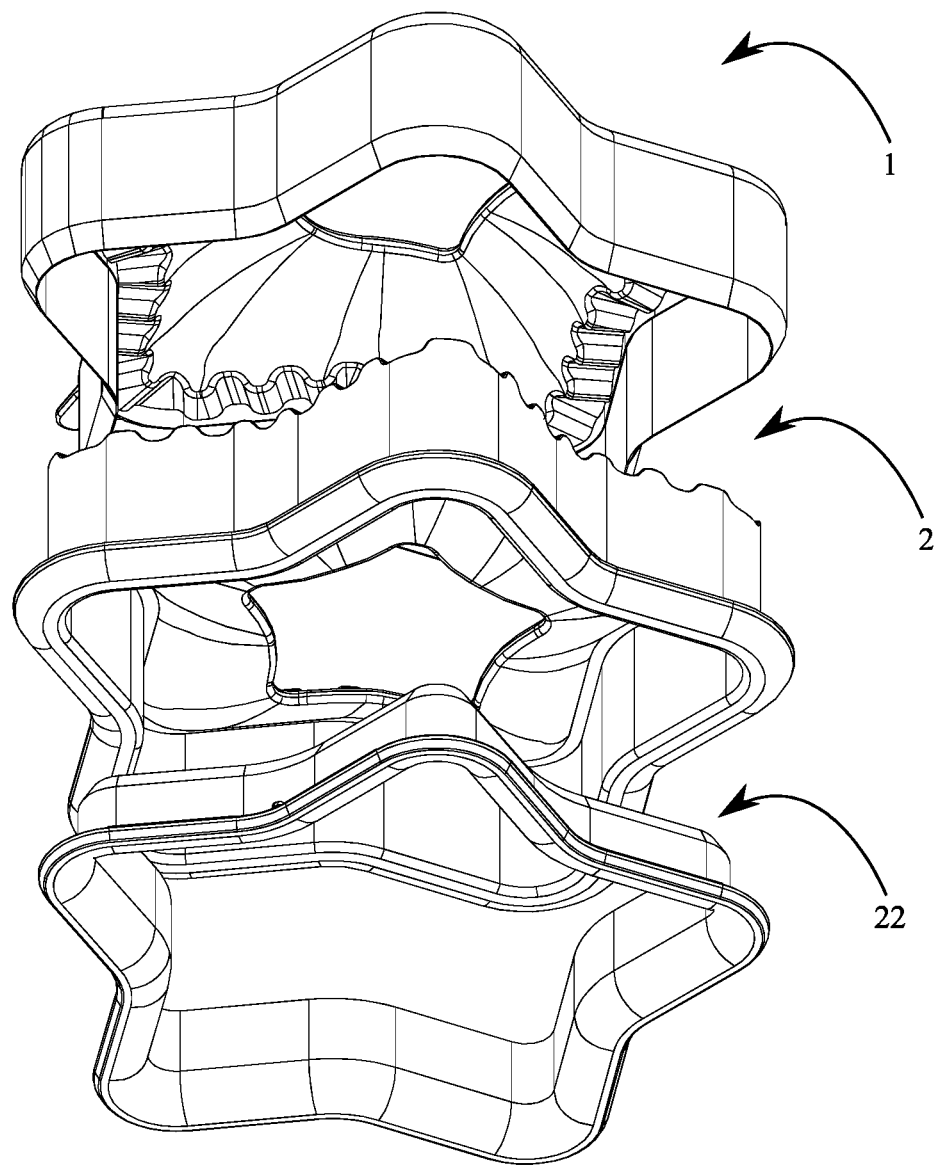
FIG. 16 is an exploded bottom-rear-right perspective view of the present invention in star shape.

It is an aim of the sandwich maker to provide users with the option of making crustless crimped sandwiches in different shapes. Accordingly, as seen in FIG. 11 and FIG. 12, the primary cutting die 1, the crimping press 2 and the secondary cutting die 22 are heart shaped. As seen in FIG. 13 and FIG. 14, the primary cutting die 1, the crimping press 2 and the secondary cutting die 22 are squares in shape. As seen in FIG. 15 and FIG. 16, the primary cutting die 1, the crimping press 2 and the secondary cutting die 22 are star shaped. However, the different components of the present invention may comprise any other shape and size, as long as intents of the present invention are not altered.

It is an aim of the sandwich maker, to provide users with different components that serve specific purposes. More specifically, the sandwich maker gives users the option to just cut the crusts off of the bread, or cut materials for the filling (such as cheese, meat, vegetables etc.), just crimp the edges of edible material that can be crimped, or just seal and crimp the edges of a sandwich, mutually exclusively, with the various components of the present invention.

A preferred method of making a crustless, sealed and crimped sandwich with the present invention comprises the following steps. Cut the crusts off of a first piece of bread using a primary cutting die 1 and cut the crusts off of a second piece of bread using the primary cutting die 1. Now, place the first piece of bread within a crimping press 2, in such a way that the cut edges of the bread touch the crimping edge of the crimping press 2. Now place a filling over the first piece of bread, followed by placing the second piece of bread over the filling, in such a way that the second piece of bread is symmetrically aligned to the first piece of bread. Subsequently, press a first crimping edge 5 of the primary cutting die at the edges of the second piece of bread and press a second crimping edge 12 of the crimping press 2 at the edges the first piece of bread, so as to seal and crimp the edges of the second piece of bread and the first piece of bread with the filling inside, thereby forming a sandwich with crimped edges. It is preferred that the primary cutting die 1 comprises a first oblique surface 6 and the crimping press 2 comprises a second oblique surface 13, wherein the first oblique 6 surface tapers above a first rim 3 and the second oblique surface tapers below the second crimping edge 12. This is so that the first oblique surface 6 and the second oblique surface 13 give the sandwich a dome shape from two opposing surfaces. Further, during the sealing process, equal pressure is applied from both the first oblique surface 6 and the second oblique surface 13, thereby allowing the filling to spread uniformly along the sandwich.

According to the preferred embodiment, the secondary die 22 may be used for cutting of filling materials for the sandwich. Preferably, the secondary die 22 cuts the filling materials to fit within the transversal cross section of the primary cutting die 1. Accordingly, the cut filler materials are placed between the first piece of bread and the second piece of bread, before the sealing and crimping process. Further, the secondary cutting die 22 is nested within the crimping press 2, and the crimping press 2 is nested within the primary cutting die 1, when not in use.

Thus, the sandwich maker enables users to have a perfectly sealed, spill proof and aesthetically appealing sandwich with crimped edges, and a slight dome shape on both surfaces of the sandwich.

Although the invention has been explained in relation to its preferred embodiment, it is to be understood that many other possible modifications and variations can be made without departing from the spirit and scope of the invention as hereinafter claimed.

What is claimed is:

1. A sandwich maker comprising:
   a primary cutting die;
   a crimping press;
   the primary cutting die comprising a first rim, a first lateral sidewall, a first crimping edge, a first oblique surface, and at least one primary blade;
   the crimping press comprising a second rim, a second lateral sidewall, a second crimping edge, and a second oblique surface;
   the first lateral sidewall being connected in between the first rim and the at least one primary blade;
   the first lateral sidewall being positioned coextensive to the at least one primary blade and the first rim;
   the first lateral sidewall comprising an inner surface and an outer surface, wherein the inner surface is positioned opposite to the outer surface across the first lateral sidewall;
   the first crimping edge being positioned perimetrically along the inner surface, and being laterally offset from the at least one primary blade;
   a first edge of the first oblique surface being perimetrically connected to the first rim;
   a second edge of the first oblique surface being positioned offset from the first rim and opposite to the at least one primary blade;
   the first oblique surface tapering from the first edge to the second edge;
   the second lateral sidewall being connected in between the second rim and the second crimping edge;
   the second lateral sidewall being positioned coextensive to the second crimping edge;
   a third edge of the second oblique surface being perimetrically connected to the second crimping edge;
   a fourth edge of the second oblique surface being positioned in between the second crimping edge and the second rim; and
   the second oblique surface tapering from the third edge to the fourth edge.

2. The sandwich maker of claim 1, wherein the crimping press is nested within the primary cutting die and the first crimping edge being pressed against the second crimping edge.

3. The sandwich maker of claim 1, comprising:
   a first plurality of folds and ridges;
   a second plurality of folds and ridges;
   the first plurality of folds and ridges being distributed along the first crimping edge; and
   the second plurality of folds and ridges being distributed along the second crimping edge.

4. The sandwich maker of claim 3, comprising:
   a first pointer extending from the first rim;
   a second pointer extending from the second rim; and
   a first transversal cross section of the first pointer corresponding to a second transversal cross section of the second pointer.

5. The sandwich maker of claim 4, wherein the first pointer is aligned with the second pointer, the first plurality of folds and ridges aligning with the second plurality of folds and ridges.

6. The sandwich maker of claim 1, wherein the second edge delineates the shape of the primary cutting die.

7. The sandwich maker of claim 1, wherein the fourth edge delineates the shape of the crimping press.

8. The sandwich maker of claim 1, comprising:
   a secondary cutting die;
   the secondary cutting die comprising a third rim, a third lateral sidewall, and at least one secondary blade;
   the third lateral sidewall being connected in between the third rim and the at least one secondary blade; and
   a transversal cross-section of the secondary cutting die corresponding to a transversal cross-section of the crimping press.

9. The sandwich maker of claim 8, comprising:
   the secondary cutting die comprising a plurality of fastening features;
   the plurality of fastening features being mounted between the third rim and the third lateral sidewall; and
   each of the plurality of fastening features being positioned offset from each other, along the third rim.

10. The sandwich maker of claim 8, wherein the secondary cutting die is nested within the crimping press.

11. The sandwich crimper of claim 10, comprising:
    at least one groove extending between the second rim and the second lateral sidewall; and
    each of the plurality of fastening features engaging within the at least one groove.

12. The sandwich maker of claim 8, wherein the primary cutting die, the crimping press and the secondary cutting die are heart shaped.

13. The sandwich maker of claim 8, wherein the primary cutting die, the crimping press and the secondary cutting die are squares in shape.

14. The sandwich maker of claim 8, wherein the primary cutting die, the crimping press and the secondary cutting die are circular in shape.

15. The sandwich maker of claim 8, wherein the primary cutting die, the crimping press and the secondary cutting die are star shaped.

16. A method of making a crustless sealed sandwich comprising;
    cutting crusts off of a first piece of bread using a primary cutting die;
    cutting crusts off of a second piece of bread using the primary cutting die;
    placing the first piece of bread within a crimping press;
    placing a filling over the first piece of bread;
    placing the second piece of bread over the filling, and symmetrically aligned to the first piece of bread;
    pressing a first crimping edge of the primary cutting die at the edges of the second piece of bread and pressing a second crimping edge of the crimping press at the edges the first piece of bread, to seal and crimp the edges of the second piece of bread and the first piece of bread with the filling inside, to form a sandwich with crimped edges;
    the primary cutting die comprising a first oblique surface;
    the crimping press comprising a second oblique surface;
    the first oblique surface tapering above a first rim; and
    the second oblique surface tapering below the second crimping edge.

17. The method of claim 16, wherein the first oblique surface and the second oblique surface give the sandwich a dome shape.

18. The method of claim 16, comprising:
cutting of filling materials by a secondary cutting die, to fit within a transversal cross section of the primary cutting die;
the cut filling materials, being placed in between the first piece of bread and the second piece of bread before sealing.

19. The method of claim 18, wherein, the secondary cutting die is nested within the crimping press, and wherein the crimping press is nested within the primary cutting die, when not in use.

\* \* \* \* \*